United States Patent [19]

Bassett et al.

[11] 4,313,861

[45] Feb. 2, 1982

[54] LATEX AUTODEPOSITION COATINGS

[75] Inventors: David R. Bassett, Charleston; Alan E. Wang, South Charleston, both of W. Va.

[73] Assignee: Union Carbide Corporation, New York, N.Y.

[21] Appl. No.: 125,692

[22] Filed: Feb. 28, 1980

[51] Int. Cl.³ ............................................. C08L 33/02
[52] U.S. Cl. ...................... 260/29.6 H; 260/29.6 TA; 427/435
[58] Field of Search ................... 526/317; 260/29.6 H, 260/29.6 TA; 148/6.2; 427/435

[56] References Cited

U.S. PATENT DOCUMENTS

| | | | |
|---|---|---|---|
| 3,458,466 | 7/1969 | Lee | 260/29.6 TA |
| 3,467,610 | 9/1969 | Fiarman | 260/29.6 TA |
| 3,770,680 | 11/1973 | Iacoviello | 260/29.6 TA |
| 3,776,848 | 12/1973 | Hall | 252/49.5 |
| 3,879,357 | 4/1975 | Wingler | 526/317 |
| 3,894,980 | 7/1975 | DeTommaso | 260/29.6 TA |
| 3,953,391 | 4/1976 | Dowbenko | 260/29.6 TA |
| 3,960,610 | 6/1976 | Steinbrecher | 148/6.2 |
| 3,970,633 | 7/1976 | Miller | 526/317 |
| 3,980,602 | 9/1976 | Jakubauskas | 260/29.6 TA |
| 4,025,692 | 5/1977 | Yamagishi | 428/418 |
| 4,051,093 | 9/1977 | Wendel | 260/29.6 H |
| 4,104,424 | 8/1978 | Steinbrecher | 427/435 |
| 4,108,817 | 8/1978 | Lochel | 260/29.6 E |
| 4,139,514 | 2/1979 | Bassett | 260/29.6 TA |

*Primary Examiner*—Paul R. Michl
*Attorney, Agent, or Firm*—Francis M. Fazio

[57] ABSTRACT

Novel autodeposition coatings formulated with acrylic copolymer dispersions which have incorporated therein either methacrylic acid or acrylic acid and, optionally, hydroxyl containing monomers or multifunctional monomers polymerized in the molecule. These novel coatings display significantly improved corrosion resistance, rinse resistance, gloss, heat aging resistance and gasoline resistance when compared to heretofore known autodeposition coatings.

16 Claims, No Drawings

LATEX AUTODEPOSITION COATINGS

BACKGROUND OF THE INVENTION

This invention relates to improved autodeposition coating systems and novel coatings for use in such systems. Autodeposition, also known as Autophoresis[R] or chemiphoresis, is a process for depositing an organic coating on a metal surface. The process involves the controlled release of multivalent metal ions from the metal surface which destabilizes dispersed polymer particles in the coating such that a coating builds up on the metal surface. Such systems are well known in the coating art and are described in, for example, U.S. Pat. No. 3,776,848, U.S. Pat. No. 3,791,431, and U.S. Pat. No. 4,108,817.

Autodeposition, though a relatively new procedure for coating metal surfaces, has achieved considerable importance and wide use in the coating industry due to its many advantages over conventional systems, such as electrolytic deposition. By using autodeposition, practitioners of the art can now deposit an inorganic and an organic film simultaneously with fewer operating steps in less time while utilizing less floor space than conventional pretreatment/electrocoating systems. Autodeposition also reduces the air and water pollution associated with conventional coating systems because organic solvent usage is minimized. The use of autodeposition also reduces significantly the energy usage required by certain conventional electrocoating systems. A further advantage is the sharply decreased safety risk attained by avoiding the use of electric current in the coating bath.

There have been a number of aqueous polymer dispersions used in autodeposition coatings. Among them are dispersions of styrene-butadiene, acrylonitrile-butadiene, polyethylene, acrylic copolymers, polyvinyl chloride and tetrafluoroethylene. Although coatings formulated with these latexes are adequate for some applications their use has exposed certain performance deficiencies as autodeposition coating systems have been applied to more rigorous and demanding industrial applications. Some areas where the heretofore available autodeposition coatings have compared unfavorably with some other conventionally applied coatings in certain industrial applications are salt spray or corrosion resistance, rinse resistance, gloss, heat aging resistance and gasoline resistance.

Salt spray or corrosion resistance refers to the ability of the coating to protect the metal substrate from corrosion. Rinse resistance is the ability of the freshly applied coating to withstand a spray rinse, which is often used industrially in lieu of a dip rinse, without being washed out. Gloss, related to the uniformity of the coating, enhances the appearance of the coated article. Heat aging resistance, the ability of a coating to withstand heat during periods of storage or service without significantly weakening or losing its protective qualities, is of considerable importance because in contemporary industrial practices coated metal parts are often stored in hot warehouses for long periods before further usage or assembly. Gasoline resistance is the ability of the coating to withstand organic solvent attack without softening.

A coating which can be used in autodeposition coating systems and which will improve the corrosion resistance, rinse resistance, gloss, heat aging resistance and gasoline resistance of heretofore available autodeposition coatings would be of great advantage.

SUMMARY OF THE INVENTION

It has now been found that certain acrylic polymeric dispersions, which are hereinafter more fully described, markedly improve the corrosion, rinse, gasoline and heat aging resistance, and gloss of heretofore available autodeposition coatings. Also found are certain parameters which will improve the performance of autodeposition coatings formulated with polymeric dispersions.

DESCRIPTION OF THE INVENTION

In accordance with the teachings of this inventions there are provided novel acrylic polymer dispersions for use in autodeposition coatings. This invention also relates to certain polymer parameters which will contribute to improved performance of the autodeposition coatings.

The improved autodeposition coatings of this invention are an aqueous acidic polymeric dispersion or latex in admixture with water wherein the dispersion comprises from about 6 to about 50 weight percent, preferably from 15 to 30 weight percent of the total coating weight. The weight of the dispersion is the wet weight and not the solid or dry weight. Preferably fluoride ion is also present in the autodeposition coatings.

The coating composition is acidic and thus contains hydrogen ion. Any acid, present in an amount sufficient to impart a pH of less than 7 to the coating composition, can be used. The acid can be a mineral acid or an organic acid. Illustrative of mineral acids that are useful in the improved autodeposition coatings of this invention one can name hydrofluoric, sulfuric, hydrochloric, nitric, phosphoric, hydrobromic, hydroriodic and the like. Illustrative of organic acids that are useful one can name acetic, chloracetic, trichloracetic, lactic, tartaric, and the like. The preferred acid is hydrofluoric acid. Of course mixtures of acids may be employed.

The acid is present in the improved autodeposition coatings of this invention in a concentration sufficient to impart to the coating composition a pH of less than 7, preferably a pH of from about 1 to about 6, most preferably a pH of from about 1.5 to about 4.5.

Preferably the improved autodeposition coatings of this invention contain fluoride ion. When present the fluoride ion is present in the coating composition in a concentration of from about 1 to about 20 grams per liter of coating composition, preferably from about 2 to about 8 grams per liter of coating composition.

The fluoride ion can be introduced to the coating composition in the form of any compound capable of dissociating so as to form fluoride ion in the coating composition. One convenient source of fluoride ion is hydrofluoric acid which, if so employed, plays a dual role in the autodeposition coating composition as both a source of fluoride ion and as a means of pH control. Other sources of fluoride ion can be alkali metal, ammonium, or other salts. A convenient salt source of fluoride ion is ferric fluoride, $FeF_3$.

The latexes or dispersions used in producing the autodeposition coatings of this invention possess certain important attributes. They are the emulsion copolymers of an acrylyl acid such as methyacrylic acid or acrylic acid. The preferred acrylyl acid is methacrylic acid present at from about 1 to 20 weight percent, preferably from about 4 to 14 weight percent, based on the total monomers weight. When acrylic acid is used it is present at from about 1 to 12 weight percent, preferably from 4 to 10 weight percent. Of course mixture can be use.

The latex copolymers can contain from 0 to about 20 weight percent, preferably up to about 6 weight percent of a monomer containing a functional hydroxyl group. Any of the known hydroxyl-functional monomers can be used and illustrative thereof one can mention 2-hydroxy ethyl acrylate, hydroxy propyl acrylate, hydroxy butyl acrylate, hydroxy ethyl methacrylate, hydroxy propyl methacrylate, hydroxy butyl methacrylate and the like.

In addition the latex copolymer can contain from 0 to about 1.5 weight percent of a polyunsaturated cross-linker, preferably up to about 1.25 weight percent. Any of the known crosslinkers can be used, the preferred being the multifunctional acrylyl compounds. Illustrative thereof one can mention trimethylolpropane tri-acrylate, ethylene glycol di(meth)acrylate, 1,4-butanediol di(meth)acrylate, 1,6-hexanediol di(meth)acrylate, 1,3-butylene glycol dimethyacrylate, neopentyl glycol di(methy)acrylate, pentaerythritol tri- and tetra(meth)acrylate, trimethylolpropane trimethacrylate and the like.

The balance of the latex polymer constitutes at least one other polymerizable ethylenically monounsaturated monomer. These are well known to those skilled in the art and can constitute from 75 to 99 weight percent of the total monomers used. Illustrative thereof one can mention styrene, acrylonitrile, methacrylonitrile, the alkyl esters of acrylic and methacrylic acids wherein the alkyl group has from 1 to 20 carbon atoms such as methyl (meth)acrylate, ethyl(meth) acrylate, propyl(meth) acrylate, butyl (meth)acrylate, 2-ethylhexyl (meth) acrylate, undecyl meth(acrylate), hexadecyl (meth) acrylate, eicosyl(meth) acrylate and the like, and ethlenically unsaturated diesters such as dimethyl, diethyl, dihexyl and di(2-ethylhexyl)maleate, fumarate and itaconate.

The latexes of the compositions of this invention can also contain up to 0.6 weight percent, preferably from 0 to 0.3 weight percent, of a chain transfer agent which is incorporated in the latex during the polymerization. Illustrative of such chain transfer agents one can name isopropanol, trichloroethylene, carbon tetrachloride, carbon tetrabromide, mercaptans, and mercaptocarboxylic acids. The preferred chain transfer agents are mercaptans such as propyl, butyl and t-dodecyl mercaptans, and mercaptocarboxylic acids and their derivatives such as thioglycolic acid and mercaptopropionic acid and their alkyl ester derivatives. When a chain transfer agent is employed the autodeposition coatings of this invention are generally observed to exhibit improved smoothness.

The polymerization procedures for the production of latexes are well known to those skilled in the art and require no further elucidation. The latexes generally have a solids content of from about 25 weight percent to about 60 weight percent although latexes having a solids content above or below this range can also be used. As used herein throughout, the latex weight refers to the total or wet weight, i.e., the weight of polymer and water, and not to dry weight. These latexes can also contain other additives, such as emulsifiers, protective colloids and the like commonly present in latex formulations. Those skilled in the art are familiar with these additives and the normal concentrations in which they are present.

The improved autodeposition coatings of this invention can also contain other additives which are commonly present in autodeposition coatings such as coalescing agents, wetting agents or other surfactants, oxidizing agents, pigments, rust preventatives, odor control agents, antiseptics, etc. Those skilled in the art of autodeposition coating formulation are familiar with these additives and the normal concentrations in which they are present in autodeposition coatings.

The autodeposition coatings formulated with the above-described latexes exhibit significant improvement in corrosion resistance over that obtained by use of autodeposition coatings formulated with commercially available latexes. The corrosion resistance of a coating depends on the adhesive and barrier properties of the organic polymers. It has been found that three properties of the latex resin have an effect on these adhesives and barrier properties and hence on the corrosion resistance of the autodeposition coating. These three properties are (1) the type and amount of functional group copolymerized in the resin, and (2) the molecular weight of the resin, and (3) the glass transition temperature of the resin.

Functional groups found to have a beneficial effect on corrosion resistance are acid groups and hydroxyl groups. Acids groups are a more important functional group in this respect than are hydroxyl groups. The acids groups are provided to the resin by the previously mentioned acrylyl acid; methacrylic acid is preferred over acrylic acid as the source of acid groups. The hydroxyl groups, if desired, are provided to the resin by the previously mentioned hydroxy-functional monomer; the preferred source of hydroxyl groups is hydroxyethyl acrylate.

The polyunsaturated monomer, or crosslinker, has in the described concentration, a beneficial effect on corrosion resistance by influencing the molecular weight of the resin by inducing internal crosslinking. Preferably, the crosslinker, is trimethylol propane triacrylate.

The glass transition temperature (Tg) of the resin has been found to have a significant effect on the corrosion resistance of the autodeposition coating. Normally, a glassy polymer is changed to a rubbery polymer over a range of temperature. As used herein the Tg values reported refer to the temperature at the onset of the transition. It has been found that the Tg of the resin should be from 2° C. to 50° C. in order to obtain the improved corrosion resistance of the improved autodeposition coatings of this invention; it is preferred that the Tg be from 8° C. to 30° C.

It has been found that the particle size of the latex has an effect on the rinse resistance of the autodeposition coating. Generally, the smaller the particle size the better the rinse resistance. Preferably the particle size of the latex is less than 0.3 micron; more preferably the particle size is 0.15 micron or smaller.

It has been observed that autodeposition coatings formulated with latexes of the composition and design of this invention show significantly improved gloss over autodeposition coatings formulated with commercially available latexes although it has also been observed that autodeposition coatings formulated with greater than 10 weight percent acrylonitrile do not exhibit as good a gloss improvement as do the other latexes of the compositions of this invention. This was completely unexpected and applicants can offer no explanation for this very beneficial effect.

The autodeposition coatings formulated with the improved latexes of this invention display better heat aging resistance than autodeposition coatings formulated with commercially available latexes. While not wishing to be held to any theory, it is applicants' belief that the increased stability of the improved latexes of this invention is primarily due to the reduced unsaturation of the resin in applicants' latex compared to the resins now in use in latexes for autodeposition coatings.

The autodeposition coatings formuluated with the improved latexes of this invention display significantly improved gasoline resistance than autodeposition coatings formulated with commercially available latexes. The improved gasoline resistance is best shown when the latex is formulated with from about 10 to about 50 weight percent acrylonitrile, based on the total monomers weight. Gasoline resistance is an important requirement when the coatings are employed in automotive coating applications.

The improved autodeposition coatings of this invention can be applied to any metal substrate using conventional autodeposition coating procedures well known to those skilled in the art. The improved autodeposition coatings of this invention also can be applied to metallic surfaces which have thereon a previously formed coating. Such previously formed coatings may be of the crystalline or amorphous types. Processes and compositions for applying such coatings are well known. For example, such coatings include those that are generally referred to as phosphates, chromates, oxalates and oxides (anodized or chemically converted) coatings.

In a typical embodiment, a latex of an acrylic polymer having a composition of styrene and butyl acrylate and having incorporated in it methacrylic acid and trimethylol propane triacrylate is formulated into an autodeposition coating. The autodeposition coating is applied to cold rolled steel and rinsed first with tap water and then with reaction rinse. The coated steel is baked and the coating cures to a smooth, hard, securely adhered surface.

The autodeposition coatings of this invention can be used in many applications among which one can name the automotive industry as an important beneficiary of these novel coatings.

Although a number of latexes have found use in autodeposition coating systems to date, it was not predictable that the novel acrylic copolymer dispersions of this invention, when formulated into autodeposition coatings, would exhibit such general over-all superior coating characteristics over heretofore available autodeposition coatings when coated onto metal surfaces.

The following examples serve to further illustrate the invention. Unless otherwise indicated all parts are parts by weight.

In the examples the following abbreviations are used.
STY—Styrene
MMA—Methyl Methacrylate
EA—Ethyl Acrylate
BA—Butyl Acrylate
MAA—Methacrylic Acid
AA—Acrylic Acid
AN—Acrylonitrile
BD—Butadiene
HEA—2-Hydroxyethyl Acrylate
TMPTA—Trimethylol Propane Triacrylate Examples 1 to 4 illustrate the preparation of latexes useful in the improved autodeposition coatings of this invention.

EXAMPLE 1

There were charged to a three-liter glass reaction flask, equipped with a stirrer, thermometer, nitrogen inlet, monomer addition inlet and reflux condenser, 800 parts of distilled water. The flask was immersed in a thermostated water bath, the contents brought to 80° C. and there were added 5 parts of a 75 percent solution of dioctyl sodium sulfosuccinate surfactant and 2 parts of ammonium persulfate initiator. After 5 minutes the monomer feed was started at a rate of 4 parts per minute. The monomers feed was a mixture of 263 parts of styrene, 385 parts of butyl acrylate, and 52 parts of methacrylic acid. After one quarter of the monomers feed was fed to the reaction vessel, a separate catalyst feed, composed of 100 parts of water and 2 parts of ammonium persulfate was started at a rate of about 0.7 per per minute. The two feed rates were selected such that both feed rates would end at approximately the same time. When the monomers feed was completed, the latex was kept at 80° C. for an additional hour and then removed from the reactor. The polymer had a composition of 37.5/55/7.5—styrene/butyl acrylate methacrylic acid, a solids content of 43 percent, a Brookfield viscosity of about 50 cps at 25° C. and a pH of 2.2.

EXAMPLE 2

To the reactor described in Example 1, there were charged 800 parts of distilled water, 6 parts of the surfactant of Example 1 and 2 parts of ammonium persulfate initiator. Two feeds tanks were connected in series with Tank I feeding in the polymerization reactor and Tank II feeding into Tank I. The contents of monomers feed Tank II, a mixture of 77 parts of styrene, 238 parts of butyl acrylate and 35 parts of methacrylic acid, were pumped at the rate of 2 parts per minute into monomers feed Tank I which contained a mixture of 140 parts of styrene, 175 parts of butyl acrylate, 35 parts of methacrylic acid and 7 parts of trimethylol propane triacrylate and the mixture was stirred. Simultaneously with the pumping of the contents of Tank II into Tank I, the contents of Tank I, under constant stirring were pumped into the reactor at a rate of 4 parts per minute. A catalyst feed, as in Example 1, was fed to the reactor and the reaction proceeded as in Example 1. The polymer has a composition of 31/59/10/1—styrene/butyl acrylate/methacrylic acid/trimethylol propane triacrylate, a solids content of 43.2 percent, a Brookfield viscosity of about 50 cps at 25° C. and a ph of 2.2.

EXAMPLE 3

The procedure described in Example 2 was repeated. In this example the reactor was initially charged with 800 parts of distilled water, 3 parts of the surfactant of Example 1, 4 parts of dicyclohexyl sodium sulfosuccinate as surfactant and 2 parts of ammonium persulfate. Tank II initially contained 137.5 parts of styrene, 45 parts of butyl acrylate, 140 parts of ethyl acrylate and 27.5 parts of acrylic acid; Tank I initially contained 125 parts of styrene, 200 parts of butyl acrylate and 25 parts of acrylic acid. The product polymer had a composition of 37.5/35/20/7.5—styrene/butyl acrylate/ethyl acrylate/acrylic acid, a solids content of 43.1 percent, a Brookfield viscosity of 40 cps at 25° C. and a pH of 2.2.

EXAMPLE 4

To the reactor described in Example 1 there were charged 800 parts of distilled water, 3 parts of the surfactant of Example 1, 2 parts of dicyclohexyl sodium sulfosuccinate as surfactant and 2 parts of ammonium persulfate following a procedure similar to that described in Example 1. The monomers feed, composed of 259 parts of acrylonitrile, 406 parts of butyl acrylate and 35 parts of methacrylic acid was started. When the monomers feed was completed, the latex was kept at 80° C. for an additional hour and then 50 parts of a 7 percent aqueous solution of t-butyl hydroperoxide was added, followed by the addition, after 10 minutes had elapsed, of 35 parts of a 7 percent aqueous solution of sodium formaldehyde sulfoxylate. The latex was kept at 80° C. for an additional 20 minutes and then removed from the reactor. The product polymer had a composition of 37/58/5—acrylonitrile/butyl acrylate/methacrylic acid, a solids content of 41.6 percent, a Brookfield viscosity of 15 cps at 25° C. and a pH of 4.1.

EXAMPLE 5

This example illustrates the significantly improved corrosion resistance obtained when using the autodeposition coatings containing the latexes of this invention over that obtained when using one of the commercially available autodeposition coatings.

A number of latexes having the compositions shown in Tables I–III were prepared. The latexes of Runs 1 and 3 of Table I, 3 and 4 of Table II and 2 of Table III were prepared according to the procedure described in Example 1; the latexes of Run 2 of Table 1 and Run 1 of Table III were prepared according to the procedure in Example 2; the latexes of Rinse 1 and 2 of Table II were prepared according to the procedure described in Example 3; the latexes of Rinse 4 and 5 of Table I were prepared according to the procedure described in Example 4. The latexes were formulated into autodeposition coatings according to the following procedure:

Two hundred grams of latex were diluted with 400 ml of distilled water. Fifty ml of an autodeposition starter solution composed of water, 15 ml of a 21 percent solution of hydrofluoric acid and 4.1 grams of ferric fluoride, FeF$_3$, were diluted with about 100 ml of water and then slowly poured into the latex mixture; distilled water was then added to make the final volume of the coating bath 1 liter.

Cold rolled steel panels were coated using the autodeposition process according to the following procedure:

The panels were cleaned in an alkaline cleaning solution composed of 235 grams of a commercial cleaner in 5000 ml of water at 150° F. for 2 minutes followed by rinsing with a deionized water spray. The panels were then dipped in the coating bath for 1–2 minutes at ambient temperature, held in the air for 1–2 minutes, rinsed with tap water for 1 minute, rinsed for 0.5–1 minute with an autodeposition reaction rinse having hexavalent chrome in solution, and then baked for 15 minutes at 160° C.

Corrosion resistance was measured according to ASTM D-1654-74. Each panel was scribed diagonally and placed in a salt spray box. Corrosion for both the scribe and the field was rated on a scale of 0–10, with 10 signifying no corrosion.

Table I shows the results of 504 hours of salt spray on coated panels. For comparative purposes a panel was coated and tested using one of the commercially available autodeposition coatings having a composition of about 62/33/1.5/3.5—styrene/butadiene/acrylic acid/vinylidene chloride as a control; the results of the tests is also shown in Table I.

TABLE I

| Run | Polymer Composition | | | | | Thickness (mils) | Corrosion | |
|---|---|---|---|---|---|---|---|---|
| | STY | BA | MAA | TMPTA | AN | | Scribe | Field |
| 1 | 37.5 | 55 | 7.5 | — | — | 0.8 | 6 | 10 |
| 2 | 35 | 55 | 10 | 1 | — | 0.9 | 9 | 10 |
| 3 | 30 | 55 | 15 | — | — | 0.8 | 8 | 10 |
| 4 | — | 58 | 5 | — | 37 | 1.2 | 7 | 10 |
| 5+ | 3 | 55 | 10 | — | 37 | 1.2 | 7 | 10 |
| Control | | | | | | 0.8 | 4 | 10 |

+Prepared with 0.25 percent n-butyl mercaptan as the chain transfer agent.

A similar test, for 168 hours, was conducted. The results, including a similar comparison with the same commercially available coating, are shown in Table II.

TABLE II

| Run | Polymer Composition | | | | | | | Thickness (mils) | Corrosion | |
|---|---|---|---|---|---|---|---|---|---|---|
| | STY | MMA | EA | BA | MAA | AA | HEA | | Scribe | Field |
| 1 | 37.5 | — | 20 | 35 | — | 7.5 | — | 0.8 | 6 | 10 |
| 2 | 40 | — | 15 | 35 | 5 | — | 5 | 0.5 | 9 | 9 |
| 3 | 35 | — | — | 55 | 10 | — | — | 0.8 | 9 | 10 |
| 4 | — | 45 | — | 50 | 5 | — | — | 0.8 | 7 | 9 |
| Control | | | | | | | | 0.8 | 5 | 10 |

For the 504 hour test, autodeposition coatings formulated with a commercially available resin showed a scribe rating of 4, which corresponds to a rust creepage of ¼ inch. Autodeposition coatings formulated with the latexes of this invention, showed much better corrosion resistance. The poorest of the five samples showed a rating of 6, corresponding to a rust creepage of only ⅛ inch, an improvement over the commercially available coating by a factor of 2.

For the 168 hour test, autodeposition coatings with a commercially available resin showed a scribe rating of 5, which corresponds to a rust creepage of 3/16 inch. Again the improved autodeposition coatings of this invention exhibited much better corrosion resistance. However, while the field rating of runs number 2 and 4 were slightly inferior, they showed much better scribe protection with creepage of only 1/16 inch for run 4 and of only 1/64 inch for run 2.

These results clearly demonstrate the overall improved corrosion resistance of the autodeposition coatings of this invention over that of a commercially available industrial autodeposition coating.

To further illustrate the improved corrosion resistance of the compositions of this invention, two panels were coated using autodeposition coatings containing two acrylic latexes disclosed in this invention and tested for 1000 hours using the above-described salt spray test procedures. The results are shown in Table III.

TABLE III

| Polymer Composition | | | | Thickness | Corrosion | |
|---|---|---|---|---|---|---|
| STY | BA | MAA | TMPTA | (mils) | Scribe | Field |
| 31 | 59 | 10 | 1 | 1.1 | 6 | 10 |
| 35 | 55 | 10 | — | 1.1 | 7 | 10 |

These results demonstrate that the corrosion resistance of the autodeposition coatings of this invention after exposure to 1000 hours to the salt spray is equal to or exceeds that of one of the commercially available autodeposition coatings based on a styrene-butadiene latex which has been subjected to only 168 hours of salt spray. Rarely does an organic coating provide adequate corrosion protection for untreated steel. This is a clear demonstration that the improved autodeposition coatings of this invention provide excellent corrosion protection for untreated steel, up to 1000 hours salt spray, which is unmatched in the industry.

EXAMPLE 6

To the reactor described in Example 1 there were charged 900 parts of distilled water, 4 parts of a of a 75 percent solution of dioctyl sodium sulfosuccinate and 3 parts of dicyclohexyl sodium sulfosuccinate as surfactant, and 4 parts of ammonium persulfate initiator, following a procedure similar to that described in Example 1. The monomers feed, composed of 296 parts of acrylonitrile, 464 parts of butyl acrylate, 40 parts of methacrylic acid and 2 parts of a 75 percent solution of dioctyl sodium sulfosuccinate, was fed to the reactor at a rate of 4 parts per minute. After one tenth of this monomers feed had been completed, 1 part of thioglycolic acid as a chain transfer agent was added to the monomers mix. After two-thirds of the monomers feed was completed, a separate catalyst feed, containing 50 parts of water and 1 part of ammonium persulfate, was started at a rate of about 0.6 parts per minute so that both feeds would be completed at about the same time. When the monomers feed was completed, the latex was kept at the reaction temperature, 80° C., for an additional 20 minutes and then 70 parts of a 7 percent aqueous solution of t-butyl hydroperoxide was added, followed by the addition, after 30 minutes had elapsed, of 60 parts of a 7 percent aqueous solution of sodium formaldehyde sulfoxylate. The latex was kept at 80° C. for an additional 30 minutes and then removed from the reactor. The product polymer had a composition of 37/58/5—acrylonitrile/butyl acrylate/methacrylic acid, a solids content of 42.8 percent, a Brookfield viscosity of 15 cps at 25° C. and a pH of 4.0.

An autodeposition coating was formulated and panels were coated using the procedures described in Example 5. The cured coating containing the latex of this example was compared with the cured coating of Run 4 of Example 5 which contained a polymer which was identical to that of this example but which was not prepared with a chain transfer agent. The coating of this example exhibited significantly improved smoothness over that of the coating of Run 4, Example 5.

EXAMPLE 7

This example illustrates the improved gloss achieved with an autodeposition coating produced with the acrylic latexes of this invention over the gloss achieved with one of the commercially available autodeposition coatings as the control. In this example the coatings were pigmented by adding the latex-starter mixture, prepared by the procedure of Example 5, to a solution of about 5 grams of carbon black in about 100 ml of distilled water. Distilled water was then added to make the final bath volume about 1 liter. The novel coating of this invention had a composition of 35/55/10—STY/BA/MAA; the control was similar to that used in Example 5. Cold rolled steel panels were cleaned and coated as in Example 5. The results of two 60° C. gloss test (ASTM D-523-67) are shown in Table IV.

TABLE IV

| Control (60° Head) | Novel Coating (60° Head) |
|---|---|
| 12–15% | 55% |
| 15–18% | 55% |

EXAMPLE 8

This example illustrates the improved spray rinse resistance of the novel coating of this invention compared to that of a known styrene-butadiene based coating. A number of panels were coated, using the procedures described in Example 5 with either the novel coating or the control used in Example 7. Two types of spray nozzles were employed, Full Jet for low impingement test and Flood Jet for high impingement test. The air dry time was either 1, 2 or 3 minutes before the rinse. The novel coating had a particle size of 0.1 micron and the control had a particle size of 0.2 micron. The film thickness was measured after each rinse and the results are shown in Table V.

TABLE V

| Sample No. | Coating (min.) | Air Dry Time | Nozzle Type | Spray Pressure (psi) | Dry Film Thickness (mils) | Edge Pick-off |
|---|---|---|---|---|---|---|
| 1 | STY/BD | — | — | — | 1.1–1.2 | |
| 2 | " | 1 | Full | 10 | 0.9–1.1 | slight |
| 3 | " | 2 | " | " | 0.95–1.1 | very slight* |
| 4 | " | 3 | " | " | 0.95–1.05 | " |
| 5 | STY/ACRYLIC | — | — | — | 1.1–1.2 | |
| 6 | STY/ACRYLIC | 1 | Full | 10 | 1.1–1.2 | very slight |
| 7 | STY/ACRYLIC | 2 | " | " | 1.1–1.2 | " |

TABLE V-continued

| Sample No. | Coating (min.) | Air Dry Time | Nozzle Type | Spray Pressure (psi) | Dry Film Thickness (mils) | Edge Pick-off |
|---|---|---|---|---|---|---|
| 8 | STY/ACRYLIC | 3 | " | " | 1.1–1.2 | " |
| 9 | STY/BD | 1 | Flood | 17 | 1.0–1.1 | 20–25% |
| 10 | " | 2 | " | " | 1.0–1.11 | 10–15% |
| 11 | " | 3 | " | " | 1.0–1.1 | 5–10% |
| 12 | " | 2 | " | 10 | 0.9–1.0 | <5% |
| 13 | STY/ACRYLIC | 1 | " | 17 | 1.0–1.1 | very slight |
| 14 | STY/ACRYLIC | 2 | " | " | 1.0–1.1 | " |
| 15 | STY/ACRYLIC ½ Ratio of STY/ACRYLIC AND | 3 | " | " | 0.9–1.0 | " |
| 16 | STY/BD | 2 | Flood | 17 | 1.5 | very slight |

*The very slight edge pick-off was caused by mechanical abrasion when placing the wet panels into the frame holder. The film thickness of sample No. 1 and 5 can be considered as the original thickness of the films before rinsing.

Under the 10 psi pressure rinse there is similar edge pick-off regardless of the autodeposition coating used though a considerably greater amount of film thickness of the STY/BD coating is washed away. Under the 17 psi pressure rinse there is a great difference in the edge pick-off, thus demonstrating the superior rinse resistance of the coatings of this invention. Furthermore, as shown in Table V, adding the novel coating to the known coating in only a 1:2 ratio significantly increased the rinse resistance of the commercially available coating. Thus it is clearly demonstrated, that under all conditions, i.e., either high or low impingement, the improved autodeposition coating of this invention exhibits much better rinse resistance than that exhibited by the commercially available coating.

EXAMPLE 9

This example illustrates the improved heat aging resistance of the autodeposition coatings produced with the latexes of this invention in comparison with that of a commercially available autodeposition coating. The improved coating of this invention employed in this example was the same as that shown in Run 3 of Table II; the control was the same as that used in Example 5. The coatings were prepared and the panels coated as in Example 5. The novel STY/ACRYLIC autodeposition coating was unpigmented; the known STY/BD coating was pigmented with carbon black. The panels measured 4×6 inches and were cured under the conditions shown in Table VI. The film thicknesses ranged from 1–1.2 mils. After the autodeposition coatings were applied and cured, two additional coatings were applied. The first, a commercially available primer-surfacer was sprayed on and baked at 325° F. for 20 minutes with a thickness of about 1.5 mils. The second, a commercially available white acrylic type 2 topcoat, was sprayed on and baked at 250° F. for 30 minutes with a thickness of about 2 mils. Then the panels were heated aged at 158° F. differing lengths of time and impacted at 80 inch-pounds. The concentrical cracking of the paint films was then measured. The results are shown in Table VI.

TABLE VI

| Coating | Curing Conditions min, °C.) | Thickness (mils) | Heat Aged Time (days) | Concentrical Cracking (inches) |
|---|---|---|---|---|
| STY/ACRYLYL | 20,120 | 4.75 | 0 | None |
| " | " | " | 1 | " |
| " | " | " | 4 | " |
| " | " | " | 10 | " |
| " | 15,160 | 4.7 | 0 | " |
| " | " | " | 1 | " |
| " | " | " | 4 | " |
| " | " | " | 10 | " |
| " | 15,160* | 4.6 | 0 | " |
| " | " | " | 1 | " |
| " | " | " | 4 | " |
| " | " | " | 10 | " |
| STY/BD | 15,160 | 4.9 | 0 | 1/16 paint loss |
| " | " | " | 1 | 1/16–1/8 paint loss |
| " | " | " | 4 | 1/16–3/16 paint loss |
| " | " | " | 10 | ⅛–¼ paint loss |

*Immersed in chrome rinse for 90 seconds before baking.

This example clearly demonstrates the superior heat aging resistance of the novel acrylyl-based autodeposition coatings of the invention. As can be seen from Table VI, no impact failure was observed from coatings prepared with the latexes of this invention. However impact failure was observed from coatings prepared with the commercially available STY/BD latex. The initial crack width along the concentrical ring generated by the impact test was 1/16". This value increased along with the heat aging time. After 10 days of heat aging, the crack width increased to from ⅛ inch to ¼ inch. The decrease in impact resistance of the commercially available autodeposition coating indicates that the polymer underwent deleterious chemical changes during the heat aging process.

EXAMPLE 10

This example illustrates the effect of polymer glass transition temperature (Tg) on the salt spray corrosion resistance of autodeposition coatings.

Two coatings having the compositions and glass transition temperatures shown in Table VII were prepared and coated on steel panels using the procedures previously described in Examples 1 and 5. The coatings were evaluated for salt spray corrosion resistance using the test described in Example 5. The results after 504 hours of salt spray are shown in Table VII.

TABLE VII

| Run | Polymer Composition | | | Thickness (mil) | Tg. °C. | Corrosion | |
|---|---|---|---|---|---|---|---|
| | STY | BA | MAA | | | Scribe | Field |
| 1 | 35 | 55 | 10 | 0.8 | 15 | 7 | 10 |
| 2 | 22 | 68 | 10 | 0.8 | −2 | 4 | 10 |

As is shown in Table VII, the coating of Run 2 which had a Tg outside the range required for the improved coatings of this invention exhibited far inferior corrosion resistance than the autodeposition coating formulated with a resin having a Tg within the defined Tg range. Although both coatings showed good corrosion resistance in the field, the creepage along the scribe of the coating whose polymer Tg is outside the required range is rated at 4, corresponding to creepage of ¼ inch while that of the coating whose polymer Tg is within the required range is rated at 7, corresponding to only 1/16 inch, an improvement of fourfold.

EXAMPLE 11

This example demonstrates the improved gasoline resistance of the improved autodeposition coatings of this invention in comparison with that of a commercially available autodeposition coating.

An autodeposition coating was prepared by a procedure similar to that described in Example 4. This coating and a control similar to that used in Example 5 were coated on panels and baked following the procedure of Example 5. The gasoline resistance of the coated panels was determined by ASTM D-2792-69. The coated panels were soaked in regular leaded gasoline for 24 hours then allowed to dry for 30 minutes in air. The extent of film softening was determined by a pencil hardness test (ASTM D-3363-74) comparing the pencil hardness of the coatings before and after the gasoline soak. The results are shown in Table VIII.

TABLE VIII

| Polymer Composition | | | Pencil Hardness | |
|---|---|---|---|---|
| BA | AN | MAA | Before Soak | After Soak |
| 58 | 37 | 5 | 2H | F |
| CONTROL | | | 2H | 4B |

These results show that after 24 hours of gasoline soak, the commercially available autodeposition coating softens much more than the improved acrylyl-based autodeposition coating of this invention and clearly demonstrate the improved gasoline resistance of the improved autodeposition coatings of this invention over the heretofore available autodeposition coatings.

What is claimed is:
1. In an aqueous autodeposition coating composition have a pH of less than 7 comprising:
   (I) water;
   (II) a source of hydrogen ion; and
   (III) from 6 weight percent to 50 weight percent of a latex, the improvement wherein said latex is an acrylic polymer latex comprising the polymer of:
   (A) from 1 weight percent to 20 weight percent of methacrylic acid or from 1 weight percent to 12 weight percent of acrylic acid;
   (B) from 75 weight percent to 99 weight percent of at least one other polymerizable ethylenically monounsaturated monomer;
   (C) from 0 weight percent to 20 weight percent of a different hydroxy group containing polymerizable vinylenically monounsaturated monomer; and
   (D) from 0 weight percent to 1.5 weight percent of a polymerizable vinylenically polyunsaturated monomer;
wherein the concentrations of components A-D are based on the total combined weight of components A-D, and wherein said acrylic polymer latex has a particle size of less than 0.3 micron and a glass transition temperature of from 2° C. to 50° C.

2. An improved autodeposition coating composition as claimed in claim 1 having a pH of from 1.5 to 4.5.

3. An improved autodeposition coating composition as claimed in claim 1 wherein said component (II) is hydrofluoric acid.

4. An improved autodeposition coating composition as claimed in claim 1 wherein there is additionally present fluoride ion in a concentration of from about 1 to about 20 grams per liter of coating composition.

5. An improved autodeposition coating composition as claimed in claim 4 wherein said fluoride ion is present in a concentration of from about 2 to about 8 grams per liter of coating composition.

6. An improved autodeposition coating composition as claimed in claim 4 wherein fluoride ion is introduced to the coating composition in the form of ferric fluoride, $FeF_3$.

7. An improved autodeposition coating composition as claimed in claim 1 wherein said component (A) is methyacrylic acid at a concentration of from 4 weight percent to 14 weight percent.

8. An improved autodeposition coating composition as claimed in claim 1 wherein said component (A) is acrylic acid at a concentration of from 4 weight percent to 10 weight percent.

9. An improved autodeposition coating composition as claimed in claim 1 wherein said component (B) is chosen from the group comprising styrene, methyl methacrylate, butyl acrylate, ethyl acrylate and acrylonitrile.

10. An improved autodeposition coating composition as claimed in claim 1 wherein said component (C) is present in a concentration of from 0 weight percent to 6 weight percent.

11. An improved autodeposition coating composition as claimed in claim 1 wherein said component (C) is hydroxyethyl acrylate.

12. An improved autodeposition coating composition as claimed in claim 1 wherein said component (D) is present at a concentration of from 0 weight percent to 1.25 weight percent.

13. An improved autodeposition coating composition as claimed in claim 1 wherein said component (D) is trimethylol propane triacrylate.

14. An improved autodeposition coating composition as claimed in claim 1 wherein said particle size is equal to or less than 0.15 micron.

15. An improved autodeposition coating composition as claimed in claim 1 wherein said glass transition temperature is from 8° C. to 30° C.

16. An improved autodeposition coating composition as claimed in claim 1 wherein there is additionally present a pigment.

* * * * *